Oct. 6, 1970  N. F. BROWN  3,532,319
VIBRATION ISOLATING MOUNT
Filed April 23, 1968

Inventor
Neil F. Brown
By
Wheeler, Wheeler, House & Clemency
Attorneys

United States Patent Office 3,532,319
Patented Oct. 6, 1970

3,532,319
VIBRATION ISOLATING MOUNT
Neil F. Brown, Waukegan, Ill., assignor to Outboard Marine Corporation, Waukegan, Ill., a corporation of Delaware
Filed Apr. 23, 1968, Ser. No. 723,369
Int. Cl. F16f 15/08
U.S. Cl. 248—358          9 Claims

ABSTRACT OF THE DISCLOSURE

Disclosed herein is a device which is adapted for connecting two members and which affords different spring rates to forces exerted in three mutually perpendicular directions so as to provide optimum vibration isolation. The device comprises an elastomeric member generally cylindrical in shape with opposed grooves which are located intermediate its length and which receive either the supporting or the supported structure. The elastomeric member, and a sleeve extending through an axial aperture in the member and a bolt connected to the other of the supporting and supported structure cooperate to place some portions of the elastomeric member in shear to forces exerted in a second direction and to place other portions of the elastomeric member in compression to forces exerted in a third direction.

BACKGROUND OF INVENTION

The invention relates to mounting means for vibrationally isolating a supported structure or member from a supporting structure. To obtain optimum vibration isolation between a supported structure and a supporting structure wherein vibrational forces are exerted on either the supporting or supported member in different directions with different amplitudes and frequencies, it is desirable to provide mounting means which affords different spring rates to forces exerted in the different directions.

SUMMARY OF INVENTION

An object of the invention is to provide a device for connecting and vibrationally isolating two structures or elements. The device includes an elastomeric member and means for mounting the member to both the supported structure or element and the supporting structure. The elastomeric member is generally in the form of a cylinder with opposed grooves which interfit in an aperture in one of the structures.

The configuration of the aperture in the structure, the geometry of the elastomeric mount and the arrangement for mounting the elastomeric member to the other of the structures result in a portion of the elastomeric member being compressed by forces exerted by one of the structures on the elastomeric member in a first direction parallel to the axis of a mounting bolt to afford a high spring rate.

With forces exerted on one of the structures in a second direction perpendicular to the first direction and perpendicular to the mounting bolt, a smaller portion of the elastomeric member is in compression to afford a low spring rate for absorbing moderate shock loads.

With forces exerted on one of the structures in a third direction perpendicular to forces exerted in the first and second directions, a portion of the elastomeric member is initially placed in shear to afford lower spring rates than the spring rates afforded in the first and second directions and maximum vibration isolation. Upon deformation of this portion of the mount by forces exerted in the third direction, an additional portion of the elastomeric member is compressed to afford a higher spring rate than when portions of the mount are in shear, for absorbing greater shock loads.

Further objects and advantages of the invention will become apparent from the following description and accompanying drawings.

Figure 1:
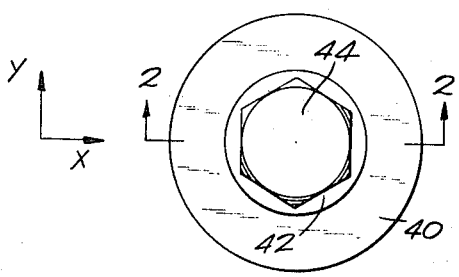
Figure 2:
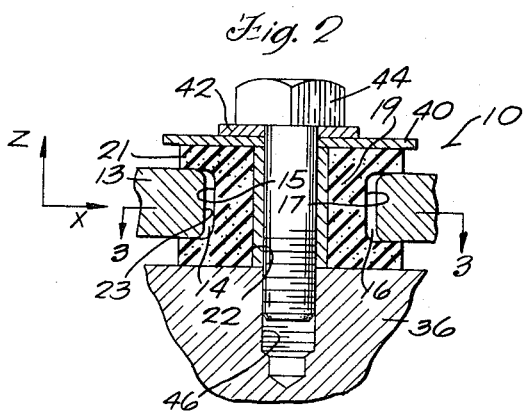
Figure 3:
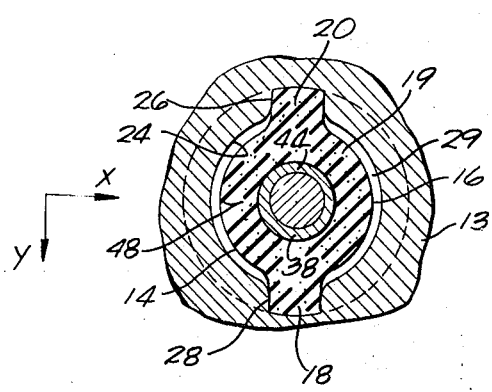
Figure 4:
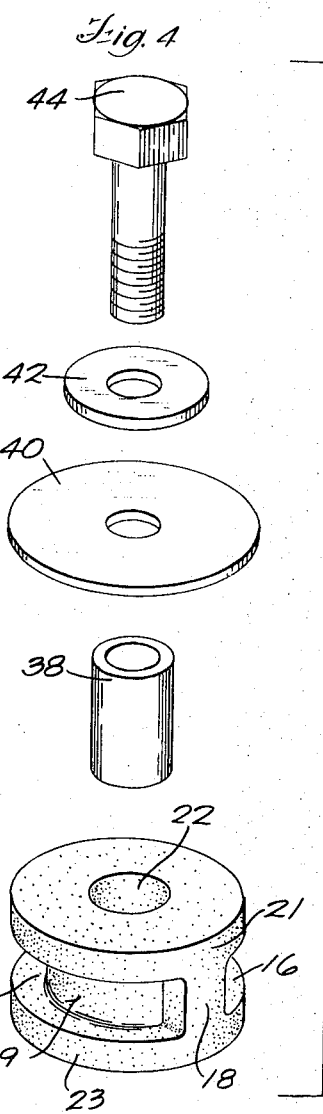

Drawings:
FIG. 1 is a plane view of the vibration isolating device in accordance with the invention.
FIG. 2 is a vertical sectional taken on line 2—2 of the device shown in FIG. 1.
FIG. 3 is a sectional view along lines 3—3 of FIG. 1.
FIG. 4 is an exploded view of the device shown in FIG. 1.

DETAILED DESCRIPTION

In the drawings, FIG. 1 shows a vibration isolating device which is generally designated 10 and which includes an elastomeric member 12 which, as best shown in FIG. 4, is generally cylindrical in shape. First means are provided to connect the elastomeric member 12 to a first element or structure 13. The first means includes opposed circumferential grooves 14 and 16 defined in part by first surfaces or arcuate bottom walls 15 and 17 which form a core 19. The grooves 14 and 16 are separated by axially and radially extending end walls 18 and 20 which extend from the core 19 and which connect outer peripheral surfaces in the form of opposed parallel flanges 21 and 23 (FIG. 4). To facilitate mounting the member 12 as hereinafter described, the member 12 has an axial aperture 22.

The first means also includes an aperture 24 in the structure 13 (FIG. 3) with radially extending slots 26 and 28 which interfit with the end walls 18 and 20. As shown in FIGS. 1 and 3, the bottom walls 15 and 17 are spaced slightly from the walls of aperture 24 by gaps 29 so that forces exerted in an X direction as hereinafter described will initially be cushioned by the end walls 18 and 20.

In accordance with the invention, second means are provided for mounting the elastomeric member 12 to a second element or structure 36. In the disclosed construction the means comprises a sleeve 38 which has a length equal to the length of member 12 and which is located in aperture 22 of member 12. The means also includes a plate 40 which has a diameter equal to or greater than the upper surface of the member 12, a washer 42 and a bolt 44. The bolt 44 extends through the washer 42, the plate 40 and the sleeve 38, and is threadably received in a threaded bore 46 in the structure or second element 36.

The vibration isolating device 10 provides varying spring rates to forces exerted in different directions. Spring rate is equal to the load in pounds divided by the deflection in inches. The differing spring rates are the result of the geometry of the elastomeric member, the location and arrangement of the elements 13 and 36 relative to the member 12 and the first and second mounting means. These components and their arrangement causes some portions of the elastomeric member 12 to be in shear to forces exerted in some directions and other portions of the member 12 to be in compression to forces exerted in other directions. When portions of the member 12 are in shear, the spring rate afforded is less, i.e., the member 12 offers less resistance to deflection than when portions of the member 12 of the same volume are in compression.

More specifically, when forces are exerted in a first direction along a Z axis (FIG. 1) which is parallel to the axis of the bolt 44, the flange 21 of the member 12 is in compression between the plate 40 and the structure 13 and thus affords a high spring rate to absorb heavy shock loads.

When vibrational forces are exerted on the device 10 in a second direction or along a Y axis, which is perpendicular to the Z axis and the axis of bolt 44, the end walls 18 and 20 are in compression to afford a spring rate lower than the spring rate afforded to forces exerted in the first direction to absorb moderate vibration forces or shock loads. The volume of material of the end walls 18 and 20 is less than the volume of material in the flanges 21 and 23 and thus the spring rate is less in the Z direction. Deflection along the Y axis sufficient to compress the end wall 18 and close the gap 29 between the aperture wall 24 of the supporting structure or element 13 and the bottom walls 15, 17 will afford an increased spring rate as the core 21 becomes compressed.

When forces are exerted on element 13 along an X axis which is transverse to both the Z and Y axes, the end walls 18 and 20 are in shear and afford a spring rate which is lower than the spring rate afforded by the elastomeric member 12 to forces exerted along the Y axis. When the end walls 18 and 20 are deflected a predetermined distance and the gap 29 between the core 19 and element 13 is closed, the wall of aperture 22 bears against portion 48 of the core 15 and places portion 48 in compression against the sleeve 38 and thus provides a higher spring rate as compared to the rate afforded when the end walls 18 and 20 are in shear.

Various of the features of the invention are set forth in the following claims.

What is claimed is:

1. The combination of a first element, a second element, an elastomeric member having a bore, first means for connecting one of said first and second elements to said elastomeric member and comprising opposed circumferential grooves in said elastomeric member, said grooves being defined by arcuate bottom walls, spaced flanges connected to said bottom walls, and radially and axially extending end walls connected to said flanges and said bottom walls, and an aperture in said one element, said aperture having arcuate first wall portions normally spaced from said bottom walls a predetermined distance and radially extending slots adapted to receive said end walls, and second means connecting the other of said first and second elements to said elastomeric member, and including means extending through said bore in said elastomeric member and connected to the other of said first and second elements, said first and second means cooperating so as to compress portions of said elastomeric member upon application of forces on one of said elements in the axial direction of said bore, to compress portions of said elastomeric member upon application of forces on one of said elements in a second direction transverse to the axial direction of said bore, and so as to afford deformation in shear of portions of said elastomeric member upon application of forces on one of said elements in a third direction transverse to the axial direction of said bore and to said second direction.

2. The combination of claim 1 wherein said spacing between said bottom wall and said arcuate first wall portions provides a gap and whereby upon application of forces between said elements in the third direction, said gap is initially closed and then a portion of said elastomeric member between said second element and said means extending through said bore is compressed.

3. The combination of claim 1 wherein said means extending through said bore comprises a sleeve having a longitudinal length equal to the length of said elastomeric member, and a stud extending between said sleeve and the other of said first and second elements.

4. The combination of claim 3 including a washer in abutting engagement with one of said flanges, and wherein the other of said flanges is in abutting engagement with said first element, and wherein said stud extends through said washer.

5. A mounting comprising an elastomeric member having a bore, first and second elements, first means including means extending through said bore for connecting said elastomeric member to said first element, means on said second element and on said elastomeric member for connecting said second element to said elastomeric member and for providing a first generally uniform spring rate for isolating vibrational forces exerted in a first direction, for providing a second generally uniform spring rate for forces exerted in a second direction transverse to said first direction, said second spring rate being lower than said first spring rate, for providing a third spring rate to forces exerted in a third direction transverse to said first and second directions, said third spring rate being lower than said first and second spring rates, and wherein upon deformation of said elastomeric member a predetermined distance in said third direction, a higher spring rate is afforded to forces exerted in said third direction than before deformation of said elastomeric member the predetermined distance.

6. A mounting comprising an elastomeric member having a bore, a first element, a second element, first means for connecting said elastomeric member to one of said first and second elements, second means for connecting the other of said elements to said elastomeric member, said elastomeric member and said first and second means cooperating to afford a first generally uniform spring rate to forces exerted on one of said elements in a first direction parallel to said bore, a second generally uniform spring rate to forces exerted on one of said elements in a second direction transverse to said first direction, said second rate being lower than said first rate, and to afford a third spring rate to forces exerted in a third direction transverse to said first and second directions, said third spring rate being lower than said first and second spring rates, and wherein upon deformation of a portion of said elastomeric member a predetermined distance in said third direction a higher spring rate is afforded than before deformation of said elastomeric member said predetermined distance.

7. A vibration isolator comprising a generally cylindrical elastomeric member, said member having and axial bore and opposed circumferential grooves defined by arcuate bottom walls, spaced flanges connected to the bottom walls, and radially and axially extending end walls connected to said flanges and said bottom walls, a first structure adapted to engage one of said flanges, a sleeve extending through said bore, said sleeve having a length equal to the axial length of said elastomeric member when in unstressed condition, a plate with an aperture, said plate being located in abutting engagement on the other of said flanges, and a bolt extending through said plate and said sleeve and united to said first structure, a second structure having an aperture therein receiving said elastomeric member such that said second structure and said elastomeric member are in abutting engagement in one direction and are spaced apart in a direction transverse to said one direction.

8. A mounting comprising an element having an aperture including a radially outwardly extending slot, said aperture being defined by first wall portions and by second wall portions extending from said first wall portions and defining said slot, and an elastomeric member having opposed circumferential grooves at least partially receiving said element, said grooves being defined by arcuate bottom walls having radial dimensions less than said first wall portions, by spaced flanges connected to said bottom walls and having outer periphery radial dimensions greater than the radial dimensions of said first wall portions, whereby said first wall portions are located radially inwardly of the outer periphery of said flanges and there is a gap between said first wall portions and said bottom walls, and by radially axially extending end walls connected to said flanges and to said bottom walls with at least one of said end walls being received in said slot.

9. A mounting comprising a first element having an aperture including a radially outwardly extending slot, said aperture being defined by first wall portions and by second wall portions extending from said first wall portions and defining said slot, an elastomeric member having an axial bore and opposed circumferential grooves at least partially receiving said element, said grooves being defined by arcuate bottom walls having radial dimensions less than said first wall portions, by spaced flanges connected to said bottom walls and having outer periphery radial dimensions greater than the radial dimensions of said first wall portions, whereby said first wall portions are located radially inwardly of the outer periphery of said flanges and there is a gap between said first wall portions and said bottom walls, and by radially axially extending end walls connected to said flanges and to said bottom walls with at least one of said end walls being received in said slot, a sleeve extending through said bore and being a length equal to the axial length of said bore, a second element and a bolt extending through said sleeve and into said second element to thereby elastomerically connect said first and second elements.

References Cited

UNITED STATES PATENTS

| | | | |
|---|---|---|---|
| 2,361,184 | 10/1944 | Ellis et al. | 248—358 |
| 2,900,202 | 8/1959 | Thompson | 287—85 X |
| 3,337,165 | 8/1967 | Kondo | 248—15 |
| 3,340,835 | 9/1967 | Cook et al. | 248—9 X |
| 3,350,042 | 10/1967 | Stewart et al. | 248—22 |

ROY D. FRAZIER, Primary Examiner

U.S. Cl. X.R.

248—15